United States Patent

Gademann et al.

[11] Patent Number: 5,473,930
[45] Date of Patent: Dec. 12, 1995

[54] ACCELERATION SENSOR WITH OPPOSITELY-POLARIZED PIEZOELECTRIC PLATES

[75] Inventors: Lothar Gademann, Rottenburg/N; Ulrich Kippelt, Eningen; Bernd Maihoefer; Botho Ziegenbein, both of Reutlingen, all of Germany

[73] Assignee: Robert Bosch GmbH, Stuttgart, Germany

[21] Appl. No.: 384,238

[22] Filed: Feb. 6, 1995

Related U.S. Application Data

[63] Continuation of Ser. No. 946,554, Sep. 17, 1992, abandoned.

[30] Foreign Application Priority Data

Oct. 26, 1991 [DE] Germany .......................... 41 35 369.2

[51] Int. Cl.$^6$ .......................... G01C 17/38; G01K 15/00; G01P 15/08; H02N 1/04
[52] U.S. Cl. .......................... 73/1 D; 73/514.34; 310/332; 310/359
[58] Field of Search .......................... 73/1 D, 1 DC, 73/1 DV, 178 R, 507, 514, 517 R, 517 AV, 517 B; 310/331, 332, 357, 359

[56] References Cited

U.S. PATENT DOCUMENTS

| | | | |
|---|---|---|---|
| 3,120,622 | 3/1962 | Dranetz et al. | 310/8.4 |
| 3,479,536 | 11/1969 | Norris et al. | 310/8.5 |
| 3,739,202 | 6/1973 | Cady | 310/8.3 |
| 4,326,143 | 4/1982 | Guth et al. | 310/329 |
| 4,532,450 | 7/1985 | McNeel et al. | 310/332 |
| 4,621,530 | 11/1986 | Dwyer et al. | 73/517 R |
| 4,661,835 | 4/1987 | Gademann et al. | 357/68 |
| 4,996,878 | 3/1991 | Kubler et al. | 73/510 |
| 5,063,782 | 11/1991 | Kellett | 73/654 |
| 5,083,466 | 1/1992 | Holm-Kennedy et al. | 73/517 R |
| 5,178,012 | 1/1993 | Culp | 73/517 B |

FOREIGN PATENT DOCUMENTS

| | | |
|---|---|---|
| 0351038 | 1/1990 | European Pat. Off. . |
| 3542397 | 4/1987 | Germany . |
| 3817354 | 12/1988 | Germany . |
| 3736394 | 5/1989 | Germany . |
| 3843143 | 6/1990 | Germany . |
| 2117115 | 10/1983 | United Kingdom . |

OTHER PUBLICATIONS

Shogo Asano et al/Matsushita, "Development of Acceleration Sensor and Acceleration Evaluation System for Super Low Range Frequency" in *Sensors & Actuators* 1991 (papers from Feb. 1991 International Congress & Exposition) SAE publication P–242, Society of Automotive Engineers, Warrendale, Pa. 15096–0001.

*Primary Examiner*—Richard E. Chilcot, Jr.
*Assistant Examiner*—William L. Oen
*Attorney, Agent, or Firm*—Frishauf, Holtz, Goodman, Langer & Chick

[57] ABSTRACT

An acceleration sensor, which is particularly adapted for use in motor vehicles, is improved by structuring it to be readily testable, to assure reliability before installation. The acceleration sensor has a piezo element (1), which consists of at least two piezo-electric plates (2) placed on top of each other, the piezo-electrical polarization of which is oriented in opposite directions. At least two electrodes (9) are placed on each of the topside (7) and the underside (8) of the piezo element (1). For testing the sensor, the piezo element is deformed by the application of an electrical voltage to electrodes (9) of a first lateral portion (11a) of the piezo element. This deformation is detected by means of a deformation-generated voltage at the electrodes (9) of a second lateral portion (11b) of the piezo element.

12 Claims, 2 Drawing Sheets

ACCELERATION SENSOR WITH OPPOSITELY-POLARIZED PIEZOELECTRIC PLATES

This application is a Continuation, of U.S. application Ser. No. 07/946,554, filed Sep. 17, 1992, now abandoned.

Cross-reference to related patents, assigned to the assignee of the present invention, the disclosures of which are hereby incorporated by reference: German patent disclosure DE-OS 34 01 404, and corresponding U.S. Pat. No. 4,661,835, GADEMANN et al., iss. Apr. 28, 1987; German patent disclosure DE-OS 40 16 032 and corresponding U.S. Ser .No. 898,898, KIPPELT et al., filed 10 Jun. 1992,issued Jan. 18, 1994 as U.S. Pat. No. 5,279,040; (Attorney docket 910187-C-MO and assignee docket R. 23454); German patent disclosure DE-OS 40 28 556 and corresponding U.S. Ser. No. 756,490 GERSTNER, filed 9 Sep. 1991, issued Jun. 22, 1993 as U.S. Pat. No. 5,200,724.

FIELD OF THE INVENTION

The invention relates to an acceleration sensor with piezo-electric plates, such as those used in motor vehicles to trigger release of airbags, and, more particularly, to an improved sensor whose operability can be readily tested.

BACKGROUND

It is already known to make testable piezo-electric acceleration sensors having two piezo-electric ceramic plates, electrodes on each of the the topside and underside, and a metallic plate between the piezo-electric plates. However, the piezo-electric polarizations, of the two piezo-electric plates used, are oriented in the same direction in this prior art structure. The electrode on the top of these acceleration sensors is divided into a driving electrode and an output electrode. The acceleration sensor is deformed by the application of an electrical voltage between the metallic center plate and the driving electrode. The deformation causes an electrical signal between the output electrodes on the top, on the underside and on the metallic center plate. This structure of testable piezo-electric acceleration sensors requires the employment of an externally electrically connected metallic center plate, since, because of the polarization of the plates in the same direction, a signal can be picked up only in this way.

THE INVENTION

In contrast to this, the testable piezo-electric acceleration sensor, in accordance with the invention, has the advantage that production of piezo elements made of piezo-electric plates with polarizations in opposite directions is simpler and thus more cost-effective. These sensors require electrodes only on the top and underside of the piezo elements; the externally electrically connected metallic plate between the individual piezo-electric plates is omitted. The production of these sensor elements can therefore be automated to a large degree. The reduced production cost makes the life-saving benefits of airbags affordable for more car buyers and their families.

A testable piezo-electric acceleration sensor is preferably made in a particularly simple manner by making the piezo element as a single piece, with at least two electrodes each on the top and the underside, the electrodes being arranged in pairs on opposite sides.

Production of such an acceleration sensor is performed simply by applying structured electrodes to the top and underside. In this case, the electrodes on the top are advantageously identical with those on the underside, so that electrical crosstalk is minimized, and space requirements are reduced. The degree of efficiency of the piezo element in respect to the conversion of acceleration into electrical signals is optimized by a conductive layer between the piezo-electric plates. However, this conductive layer is not externally electrically connected.

Structuring of this conductive layer or the use of a non-conducting layer are measured which further reduce electrical crosstalk between individual electrodes. Electrical crosstalk is particularly well suppressed by means of an air gap between the various parts of the piezo element. A particularly good mechanical connection of the various areas is achieved in this case by ceramic bars. The simplest method, from a production engineering point of view, for achieving mechanical connection of the various parts of the piezo element, is the use of drops of adhesive.

DRAWINGS

Exemplary embodiments of the invention are illustrated in the drawings, and explained in detail in the description below.

DETAILED DESCRIPTION

Figure 1:
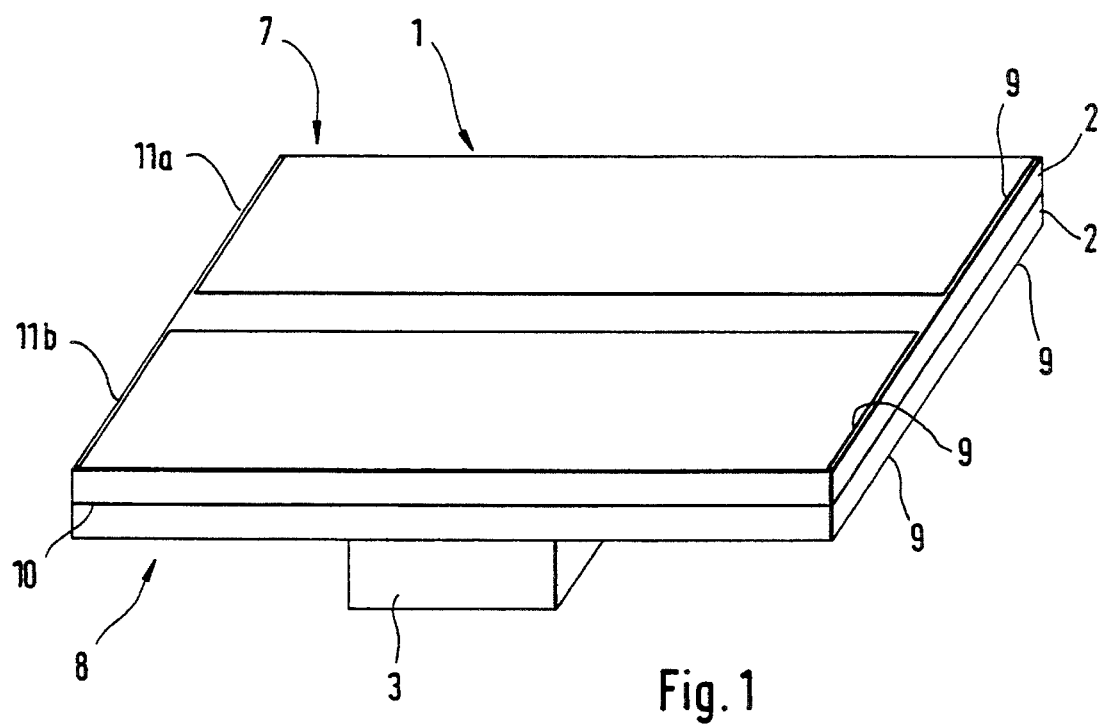
FIG. 1 illustrates an acceleration sensor, in accordance with the invention, with the piezo element formed as a single element.

A piezo element consisting of two piezo-electric plates 2 placed on top of each other is designated by 1 in FIG. 1. In its central area, the piezo element 1 is disposed on a base 3, in such a way that the piezo element 1 is deformed by acceleration. The piezo element 1 is provided with electrodes 9 on the top 7 and the underside 8. Two portions 11a and 11b of the one-piece piezo element 1 are defined by the electrodes 9 located in pairs opposite each other. The two generally planar piezo-electric plates 2 are connected by a conductive intermediate layer 10, forming a kind of sandwich structure.

The material of the piezo-electric plates 2 has the characteristic that an electrical voltage is generated on the surface of the plates when they are deformed or that the application of an external electrical voltage results in deformation of the plates. Deformation of the piezo element 1 here used is in the form of bending. The electrical voltages generated by bending are conducted via leads, not shown here, to an evaluation circuit, or an external voltage is applied to the piezo element 1 via the electrodes 9 and leads and the piezo element is bent in this way. To test the sensor, a portion 11a of the piezo element 1 is used as a driver for bending, and the other portion 11b for detecting this bending. Preferably, portions 11a and 11b are laterally adjacent sections of a unitary sandwich structure 1, as shown in FIG. 1.

The orientation of the piezo-electric polarization determines the polarity of the electrical voltage being generated, or the reaction (contraction or expansion) of the piezo-electric material. If the piezo element 1 is bent, mechanical tensile stresses are generated in one of the piezo-electric plates 2, and mechanical compressive strains are generated in the other piezo-electric plate 2. If the polarizations of the piezo-electric plates 2 are oriented in the same direction, as in the prior art, the electrical voltages generated during bending offset or cancel each other, and therefore can only be detected by means of an additional, externally connected electrode between the two plates. Because the present invention uses oppositely oriented polarizations of the plates 2, the electrical voltages generated in case of bending of the piezo element 1 are connected in series in the piezo-electric plates 2, so that they superpose or reinforce each other, and therefore can be easily detected by electrodes 9 applied only to the top 7 and underside 8, rather than three places, as in the prior art. The electrodes 9 are each formed on the top 7 and the underside 8 as separate areas 11a and 11b, which can be triggered independently of each other. Because of this feature, it is possible to test the sensor by applying an external electrical voltage to one pair of the electrodes 9 located opposite each other on the top 7 and the underside 8, then using the other pair of electrodes to detect the bending of the piezo element caused by this.

The electrodes 9 shown in FIG. 1 all have the same geometric shape. However, a multitude of variations of the geometry of the electrodes is imaginable; in particular, it could be conceivable that the electrodes for the external voltage are very small, if only a functional test of the sensor is intended, so that, in this case, the bending of the piezo elements generated during testing can be small. Whenever electrodes 9 are located on opposing sides 7, 8 of the piezo element 1, application of an electrical potential to one of electrodes 9 gives rise to an induced potential on the opposing electrode 9. This electrical crosstalk can degrade the measurability of the sensors because, in such a case, a test signal appears which does not correspond to the respective bending of the piezo element 1. Therefore the electrodes 9 should have the same shape on both sides 7, 8 of the piezo element 1.

A conductive layer 10 is placed between the two plates to assure good electrical contact between the two piezo-electric plates 2. The voltages generated in the individual piezo-electric plates 2 during bending of the piezo element 1 are connected in series by means of this conductive layer 10 and, in this way, can be measured at the electrodes 9 applied to the top 7 and the underside 8. If the conductive layer 10 extends over the entire surface between the two piezo-electric plates 2, the electrical crosstalk, between the electrodes 9, to which an external voltage has been applied, and the electrodes 9 which detect the deformation of the piezo element 1, becomes very large. For this reason, it is advantageous to structure this conductive layer 10 in the same way as the electrodes 9 on the top 7 and the underside 8 of the piezo element 1, i.e. to make layer 10 discontinuous along a boundary between portions 11a and 11b. It must be assured in this case that there are no conductive connections between the various areas of the conductive layer 10. If reduced sensitivity of the sensor is permissible, the use of an insulating layer, instead of the conductive layer 10, simplifies the production process of the piezo elements, because in this case regular adhesives can be used.

The electrodes 9 are produced by means of thin film techniques, such as vapor deposition, sputtering or etching processes. Preferably, the conductive layer 10 between the two piezo-electric plates is produced by using an adhesive made conductive by filling it with conductive metal particles. A suitable adhesive is Henkel no. 6208 with silver particles.

Figure 3:
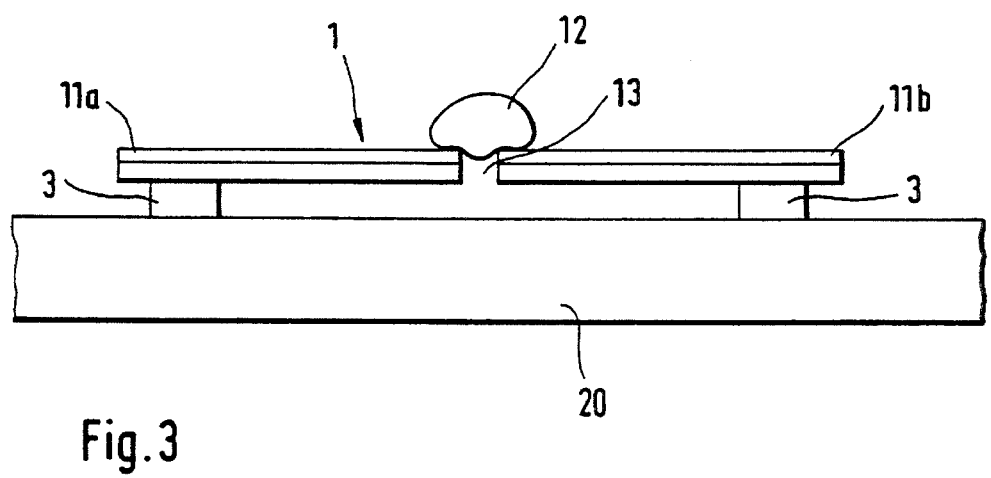
FIG. 3 illustrates an acceleration sensor with an air gap and a drop of adhesive.

The piezo element 1 is connected with a substrate, not shown in FIG. 1, by means of a base 3. In this case, the function of the base 3 is to seat the piezo element 1 in such a way that, in case of acceleration, bending of the piezo element 1 takes place. In addition, it is possible to place conductors, for providing contact with the electrode 9 on the underside 8 of the piezo element 1, on the base 3. Equivalent dispositions of the base 3 in respect to the piezo element 1 are shown in FIG. 2 and FIG. 3.

Figure 2:
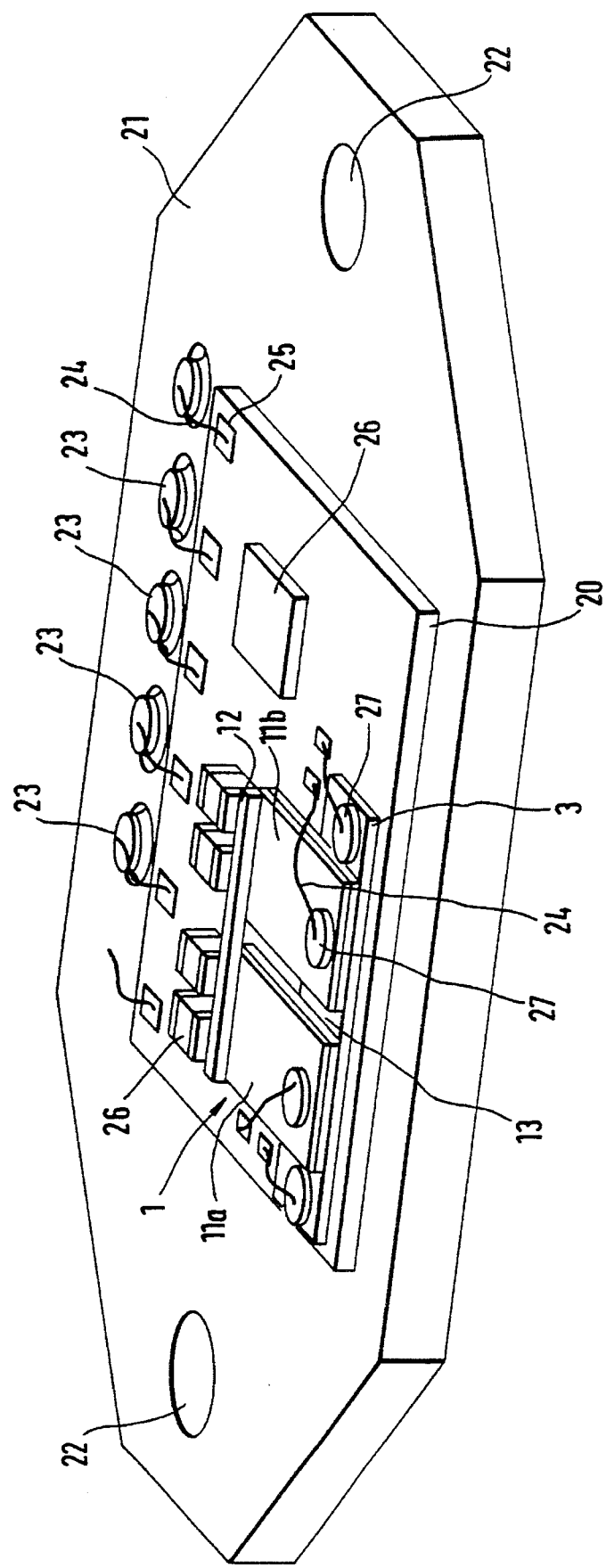
FIG. 2 illustrates an acceleration sensor with an air gap and ceramic bars.

A second exemplary embodiment of a testable acceleration sensor is shown in FIG. 2 on a thick film hybrid substrate 20. On a support plate 21, the thick film hybrid substrate 20 is provided with threaded holes 22 for fastening and with electrical duct bolts 23. Electrical contact from the electrical duct bolts 23 to the bonding pads 25 is provided by bonding wires 24. The signals of the sensor are transmitted to other circuits outside of the sensor via the electrical duct bolts 23. The support plate 21 can be provided with a cover, not shown here, which extends over the electrical duct bolts 23 and the thick film hybrid substrate 20 and in this way hermetically seals the sensor against the environment. Components 26 are disposed on the thick film hybrid substrate 20 which, together with the conductors (not shown here for reasons of simplicity), form circuits for evaluating the sensor signals. The connection between the circuits and the piezo element 1 is again provided by bonding wires 24.

The piezo element illustrated in FIG. 2 has an air gap 13 between its two parts 11a and 11b. The two parts 11a and 11b of the piezo element are constructed in a manner equivalent to the piezo element of FIG. 1, i.e. they consist of two piezo-electric plates 2, the piezo-electric polarizations of which are oriented in opposite directions, of electrodes 9 on the top 7 and the underside 8 of the piezo element 1 and of a conductive layer 10 between the two piezo-electric plates 2.

In the exemplary embodiment here shown, the disposition of the piezo element 1 on the base 3 is provided in such a way that the piezo element 1 is clamped only on one end. The two parts 11a and 11b to the right and left of the air gap 13 are mechanically connected with each other at their other ends by a ceramic bar 12. However, the two parts 11a and 11b of the piezo element 1 are very well electrically separated by the air gap 13. Therefore, the electrodes 9 of the individual parts of the piezo element 1 are each separately electrically connected. Connection of the electrode 9 on the top of the piezo elements is provided by a bonding wire 24 and a connecting point 27. Connection of the electrode 9 on the underside 8 of the piezo element 1 is provided by a bonding wire 24, a connecting point 27 and a conductive layer on the base 3. The conductive layer on the base 3 only extends under a portion of the piezo element 1. In an equivalent manner, the base 3 can consist of a conductive material, for example appropriately doped silicon. In this case, the base 3 would also have an air gap 13. The connecting point 27 consists of a glued-on metal plate, since the metal coating of the electrodes 9 cannot be directly provided with a bonding wire.

FIG. 3 illustrates an embodiment of the testable acceleration sensor which is particularly advantageous from a production engineering point of view. The two portions 11a and 11b of the piezo element are each seated at a respective end, on a base 3 on the thick film hybrid substrate 20, and separated in the center by an air gap 13. Mechanical connection between the two parts 11a and 11b of the piezo element is provided by means of a cured adhesive drop 12. The use of a cured adhesive drop 12 is particularly simple production-engineering-wise, because this adhesive drop 12 can be easily applied by means of an automatic metering device. With an appropriately high viscosity of the still liquid adhesive it is possible to bridge even large air gaps 13.

Various changes and modifications may be made, and features described in connection with any one of the embodiments may be used with any of the others, within the scope of the inventive concept.

We claim:

1. A testable acceleration sensor comprising a base (3);

at least one piezoelectric element (1), mounted on said base (3), and formed as a sandwich structure of at least two piezoelectric plates (2) superposed on each other and having respective opposite polarizations, and an intermediate solid layer (10) mechanically interconnecting said plates; and at least two electrodes (9) applied to each of first and second lateral portions (11*a*, 11*b*) of said piezoelectric element;

wherein, said lateral portions (11*a*, 11*b*) are electrically isolated from each other by an air gap (13) but are mechanically coupled to each other by a mechanical bridging means (12); and the sensor is testable by applying an electrical voltage to electrodes on said second lateral portion (11*b*), thereby causing a bending deformation of said element (1), said bending deformation giving rise to a test signal which is detectable at electrodes (9) on said first lateral portion (11*a*).

2. A testable acceleration sensor according to claim 1, wherein the piezo-electric element (1) has at least two electrodes (9) each, on an upper surface (7) and on a lower surface (8) thereof, and the electrodes (9) are arranged in pairs opposite each other.

3. A testable sensor according to claim 1, wherein said intermediate layer comprises a region of conductive adhesive (10) applied between said plates (2) in each of said first and second lateral element portions, said regions being electrically isolated from each other.

4. A sensor according to claim 3, wherein said regions are electrically isolated from each other by said air gap (13).

5. A sensor according to claim 1, wherein said mechanical bridging means is a ceramic bar.

6. A sensor according to claim 1, wherein said mechanical bridging means is a hardened adhesive droplet.

7. A sensor according to claim 2, wherein the shapes of the electrodes on said upper surface (7) and the shapes of the electrodes on said lower surface (8) are the same.

8. A sensor according to claim 2, wherein said intermediate layer (10) between said superposed plates (2) is electrically conductive.

9. A sensor according to claim 8, wherein said conductive intermediate layer (10) is shaped like said electrodes (9).

10. A sensor according to claim 1, wherein said intermediate layer includes an insulating layer between said plates (2) of said sensor.

11. A sensor according to claim 2, further comprising an insulating layer between said plates (2) of said sensor.

12. A sensor according to claim 7, wherein said intermediate layer includes an insulating layer between said plates (2) of said sensor.

* * * * *